United States Patent [19]

Moirano

[11] 4,276,320

[45] Jun. 30, 1981

[54] COMPOSITIONS AND METHOD FOR PREPARING DESSERT GELS

[75] Inventor: Arthur L. Moirano, Mountainside, N.J.

[73] Assignee: FMC Corporation, Philadelphia, Pa.

[21] Appl. No.: 115,582

[22] Filed: Jan. 25, 1980

[51] Int. Cl.$^3$ ................................................ A23L 1/04
[52] U.S. Cl. .................................... 426/575; 426/271; 426/564
[58] Field of Search ................ 426/573, 575, 564, 271

[56] References Cited

U.S. PATENT DOCUMENTS

| | | | |
|---|---|---|---|
| 2,864,706 | 12/1958 | Stoloff | 426/575 |
| 3,342,612 | 9/1967 | Foster et al. | 426/575 |
| 3,499,768 | 3/1970 | Moirano | 426/575 |
| 3,956,173 | 5/1976 | Towle | 426/575 |
| 3,962,482 | 6/1976 | Comer et al. | 426/575 |

*Primary Examiner*—Jeanette M. Hunter
*Attorney, Agent, or Firm*—Eugene G. Horsky; Charles H. Johnson

[57] ABSTRACT

A method and a kappa carrageenan composition for making a water dessert gel having a controlled melting temperature so as to soften or melt within the mouth of the consumer and providing for excellent flavor release, good mouth feel and containing only kappa carrageenan, and sodium salt of a sequestering agent with ionizable potassium in amounts sufficient to sequester all polyvalent cations present.

11 Claims, No Drawings

COMPOSITIONS AND METHOD FOR PREPARING DESSERT GELS

This invention relates to edible water gels, and particularly to carrageenan water gels having controlled melting temperatures.

Well known in the art is that carrageenan extract from *Chondrus crispus* forms a gel in a water solution; that this carrageenan contains two carrageenan components, kappa and lambda carrageenans; and that only the kappa carrageenan exhibits gel-forming characteristics in a water solution. Also recognized is that the strength of the water gel that is formed is greatly affected by the cations which are present, for example, with the presence of sodium cations imparting little gel strength, while the gel-forming properties of the kappa carrageenan are greatly enhanced in the presence of potassium cations. Thus, kappa carrageenan is often referred to in the art as "potassium-sensitive carrageenan."

While the kappa carrageenan and the lambda carrageenan can be separated, it is not necessary to do so and in the practice of the invention which ordinarily is employed is a carrageenan that contains a substantial proportion of kappa carrageenan. Carrageenan recovered from *Chondrus crispus* is of this type and can be derived from sea plants other than *Chondrus crispus*, such as, *Gigartina stellata*, *Gigartina pistillata*, *Gigartina canaliculata*, *Gigartina chamissoi*, *Eucheuma edule*, *Eucheuma okamura*, *Eucheuma striatum* and *Eucheuma cottonii*.

Notwithstanding its desirable gel-forming properties, kappa carrageenan is not without shortcomings which have limited its use in the preparation of water dessert gels. For example, U.S. Pat. No. 2,466,146 acknowledges that a water gel of carrageenan derived from *Chondrus crispus* lacks elasticity; that is, breaks with relatively little stretch, and that the presence of gel-inducing potassium cations does not provide for a significantly less brittle water gel. This patent does teach that the elasticity of such carrageenan water gel can be improved by the addition of locust bean gum or other colloidal substance of high viscosity and neutral reaction whose degree of polymerization and water absorption are substantially unaffected by heat.

On the other hand, in U.S. Pat. No. 2,864,706 the improvement of elastic properties of a gel by the addition of an extraneous gum or gelling agent to a carrageenan sol is described as unnecessary since the brittleness of a conventional carrageenan water gel is attributed to the presence of certain cations, such as sodium, calcium, magnesium and ammonium. Thus, this patent teaches that incorporating the potassium salt of a sequestering agent in the carrageenan sol serves to chemically bind the offending cations, and also supplies an abundance of potassium cations so that, not only is gelation enhanced, but the resulting gel has better elasticity. Described as particularly suitable sequestering agents are the potassium salts of polycarboxylic acids and carboxylic acids containing hydroxy groups.

A still further approach is described in U.S. Pat. No. 3,962,482 which is directed to a water gel-forming composition that includes a potassium salt and a potassium-sensitive carrageenan. The latter is produced by virtually a complete exchange of calcium and other polyvalent metal cations with potassium or sodium ions by treatment of the solution extracted from *Chondrus crispus* plants prior to the actual recovery of the carrageenan.

While the compositions described in the above noted patents overcome certain shortcomings of conventional potassium-sensitive carrageenan, they also introduce certain disadvantages which inhibit greater acceptance of kappa carrageenan for use in water dessert gels. For example, while the synergism between potassium-sensitive carrageenan and locust bean gum, as disclosed in U.S. Pat. No. 2,466,146, provides for water gels having improved elasticity and gel strength and reduced syneresis, refined locust bean gum is not only expensive, its presence requires heating of the described carrageenan composition to temperatures of about 80° C. for solution.

The composition disclosed in U.S. Pat. No. 2,864,706 also provides for a water gel that has improved elasticity and gel strength by the use of potassium salts of sequestering agents which bind with sodium, calcium, magnesium and ammonium ions that may be present during gel preparation. However, as the gelling temperature of kappa carrageenan is controlled primarily by the amount of potassium cation in solution, rather than the concentration of the carrageenan, the higher the level of potassium cation, the higher the gelling temperature as well as the remelt temperature of the formed gel. For example, a sodium carrageenan containing no potassium cations will have about the same gelling temperature regardless of whether it is used at a 0.5% or 1.0% concentration when potassium cation is added to the system. Thus, as the carrageenan composition described in this patent may also include other potassium salts, in addition to potassium salts of sequestering agents, gelation will occur at a relatively high temperature and solubilization at a still higher temperature of about 10° C. above the gelation temperature.

The carrageenan composition described in U.S. Pat. No. 3,962,482 is open to a number of objections. Not only is this composition difficult and expensive to produce, hot water is required for solution and the introduction of polyvalent cations must be avoided during gel preparation to insure that the final gel has desired elasticity and gel strength.

Common to all of the carrageenan compositions described in the above noted patents, and other similar compositions, is that solubilization of these compositions in water and the gelling of the resulting solutions will occur only at relatively high temperatures. Thus, as water dessert gels made from these known carrageenan compositions do not remelt within the mouth of the consumer, they are unsatisfactory both as to taste and eating qualities. Accordingly, a primary object of this invention is the provision of a method and a carrageenan composition for making a water dessert gel having a controlled melting temperature, and particularly a water dessert gel which will soften or melt within the mouth of the consumer, providing for excellent flavor release and acceptable eating characteristics.

Stated briefly, this invention comprises an improved aqueous gel-forming composition consisting of kappa carrageenan, a sodium salt of a sequestering agent, and potassium in an ionizable form. The sequestering agent and the potassium are present in the composition in amounts sufficient, respectively, to sequester substantially all of the polyvalent cations when the composition is dissolved in an aqueous medium, and to provide this aqueous medium with a potassium ion content of from about 200 to 800 ppm. For the sake of simplicity, it will be understood that all ppm (parts per million) concentrations set forth throughout the description and claims are based upon the total weight of the aqueous phase which includes the water and materials dissolved therein.

In the method of this invention, the carrageenan composition is merely solubilized in water which need be at only such temperature as to dissolve the carrageenan composition, after which the sol is allowed to set. Depending upon the potassium cation concentration present, but within the range specified, gelling occurs at a temperature of about 25° C. or less and the resulting gel is thermally reversible, remelting at about 35° C. While the temperature of the water required for preparation of the sol need be only slightly greater than the remelt temperature of the resulting gel, and generally need not exceed about 45° C., it will be understood that water at a higher temperature, and even boiling water, may be used without affecting the gelling or remelting temperatures or any of the other desirable characteristics of the resulting gel.

The carrageenan composition of this invention is well adapted for use in preparing acidified water dessert gels, neutral non-dairy puddings, and aerated desserts, which are referred to herein as "dessert gel", "water gel", or "gel". Dessert gels prepared with the carrageenan composition of this invention possess satisfactory elasticity and gel strength and are subject to negligible syneresis. Yet more significant is that the resulting water gel softens or melts readily within the mouth of the consumer, providing for excellent flavor release, a pleasant mouth feel, and other desirable eating qualities.

In the described carrageenan composition, the sequestering agent renders inactive substantially all of the polyvalent cations which are present during gel formation and, therefore, the resulting gel exhibits good elasticity, gel strength and resistance to syneresis. As carrageenans are normally extracted from sea plants in the presence of lime, it is not uncommon for conventional kappa carrageenan to contain from 3 to 4% of calcium cations, based upon the weight of carrageenan. When such carrageenan is used at a 1% concentration in water, the concentration of calcium cations in the aqueous solution will range from 300 to 400 ppm. Moreover, as the carrageenan composition of this invention is intended to be placed in solution with ordinary tap water, both calcium and magnesium cations are likely to be present during gel preparation. Of course the hardness of the water used will vary with location, and a very hard water can well introduce perhaps some 200 ppm of calcium cations. Accordingly, to satisfy its intended function, the sequestering agent is present in amounts ranging from 0.1 to 0.3%, based upon the weight of the water employed.

A variety of non-toxic sequestering agents, used alone or in combination, are useful in the composition of this invention. With a carrageenan solution having a low pH, as for example a pH of from about 3.0 to 5.0 as in preparing an acidified water dessert gel, polyphosphates, such as, sodium hexametaphosphate, are most effective. At a higher pH, sodium salts of orthophosphates, carbonates, pyrophosphates, and organic carboxylic acids, as well as polyphosphates, are satisfactory.

The presence of potassium cations in the carrageenan composition of this invention, of course, enhances gelation during the water gel preparation. Significant, however, is that this carrageenan composition assures the necessary gel formation, yet limits the potassium cation concentration to from 200 to 800 ppm. The necessary potassium cations may be supplied by employing potassium carrageenate in the composition formulation, or by one or more ionizable potassium salts, as when sodium kappa carrageenan is used, or by a combination of such potassium carrageenate and potassium salts. Non-toxic salts which are suitable include, for example, potassium chloride, potassium phosphate, potassium citrate, and potassium tartrate.

To attain the objects of this invention, it is essential that the described carrageenan composition, upon solubilization in water, provide a potassium cation concentration which does not exceed 800 ppm and is not less than 200 ppm. At the upper level of potassium cation concentration of 800 ppm, gelling will occur at approximately 30° C. and remelting of the formed gel at about 41° C., while at a potassium concentration of less than 200 ppm, the gel strength of the resulting product is much too weak.

The carrageenan composition of this invention may be used with iota carrageenan or locust bean gum if still further improvement in the elasticity, gel strength and syneresis of the resulting gel are desired. Conventional locust bean gum requires heating to about 80° C. to obtain solution and, due to insoluble matter, provides for a cloudy gel. While a clear and smooth gel can be attained using refined clarified locust bean gum, heating to about 80° C. is still required for solution. However, a clear and smooth gel can be formed without heating above 45° C. by employing a cold soluble locust bean gum, as is available from the Marine Colloids Division of FMC Corporation, Rockland, Maine.

In the preparation of non-dairy puddings and aerated desserts, spray dried emulsified fats are merely added to the kappa carrageenan composition of this invention and water after which the dispersion is blended or whipped and set. With the still further addition of dry powdered proteins, such as sodium caseinate, it is possible to develop a gel having a fat and protein content ranging from that of whole milk to whipping cream. Satisfactory spray dried fats are available from the Beatrice Foods Company of Chicago, Ill., under the tradenames of "Beatremes" and "Whiptremes".

In the preparation of water dessert gels with the carrageenan composition of this invention, sugar or other sweetening agents and flavoring and coloring materials are added, of course, to satisfy taste and eye appeal. In the preparation of acidified water dessert gels, one or more organic acids, such as adipic, fumaric, and citrus acids, or salts thereof, are added to impart tartness and may constitute from about 0.35% to about 0.55% by weight of the finished gel.

To further illustrate the merits of the present invention, reference is made to the following Examples in which the potassium cation ($K^+$) and calcium cation ($Ca^{++}$) contents, expressed in percentage (%), are based upon the weight of the kappa carrageenan and, expressed in ppm, are based upon the weight of the entire aqueous phase.

EXAMPLE 1

Acidified Water Dessert Gel 5 grams Potassium sensitive (kappa) carrageenan $$\left\{ \begin{array}{l} 4.27\% \text{ K}^+ \\ 3.87\% \text{ Ca}^{++} \end{array} \right\}$$

2 grams Sodium hexametaphosphate
2.5 grams Adipic acid
1.0 grams Sodium citrate
85.0 grams Sugar
Flavor & color to suit Two (2) cups (1 pint) of deionized water at 45° C. were poured over a mixture of the dry ingredients in a bowl and spoon stirred until dissolved (about 2 minutes). The solution was poured into molds and refrigerated. The gel formed at 21° C. The gel melted readily in the mouth with excellent flavor release. The melting temperature of the gel was 34° C.

This system contained 450 ppm of K+ and 400 ppm of Ca++. In this case the cations all came from the carrageenan.

EXAMPLE 2

Acidified Water Dessert Gel 5.0 grams Potassium sensitive (kappa) carrageenan-sodium form $$\left\{ \begin{array}{l} 4.47\% \text{ K}^+ \\ 0.11\% \text{ Ca}^{++} \end{array} \right\}$$

1.5 grams Sodium hexametaphosphate
2.5 grams Adipic acid
1.0 grams Sodium citrate
85.0 grams Sugar
0.91 grams Potassium bitartrate
Flavor and color to suit The dry mix was added to 2 cups (1 pint) of hard water containing 200 ppm of Ca++ at 45° C. and stirred until dissolved (about 2 minutes). The solution was poured into molds and refrigerated. The gel formed at 22° C. It melted at 35° C. The flavor release and mouth feel characteristics were excellent.

The system contained a total of 450 ppm K+ and 212 ppm Ca++. In this case most of the K+ (400 ppm) was added in the form of the potassium bitartrate and most of the Ca++ (200 ppm) came from the hard water.

EXAMPLE 3

Acidified Water Dessert Gel 2.0 grams Potassium sensitive (kappa) carrageenan $$\left\{ \begin{array}{l} 2.85\% \text{ K}^+ \\ 3.60\% \text{ Ca}^{++} \end{array} \right\}$$

1.5 grams Sodium hexametaphosphate
0.1 grams Potassium bitartrate
2.5 grams Adipic acid
1.0 grams Sodium citrate
3.0 grams Cold soluble refined locust bean gum
85.0 grams Sugar The powder was added to two cups (475 ml) of water at 45° C. and stirred until dissolved (about 2 minutes). The mixture was refrigerated. Gelling temperature was 22° C. and melting temperature was 39° C. This gel gave a faster pickup in strength under refrigeration and less syneresis than the gels of Examples 1 and 2.

The total K+ was 300 ppm and the total Ca++ was 400 ppm.

EXAMPLE 4

Acidified Water Dessert Gel 2.0 grams Potassium sensitive (kappa) carrageenan $$\left\{ \begin{array}{l} 2.85\% \text{ K}^+ \\ 3.60\% \text{ Ca}^{++} \end{array} \right\}$$

3.0 grams Iota carrageenan
0.64 grams Potassium bitartrate
2.0 grams Sodium hexametaphosphate
2.5 grams Adipic acid
1.0 grams Sodium citrate
85.0 grams Sugar This powder was added to 2 cups (475 ml) of water at 45° C. and stirred until dissolved (about 2 minutes). The mixture was refrigerated. The gelling temperature was 33° C. and the melting temperature 40° C. This gel had very low syneresis.

The total K+ was 400 ppm and the total Ca++ 400 ppm.

EXAMPLE 5

Non-dairy Custard Pudding 2.50 grams Potassium sensitive (kappa) carrageenan-sodium form $$\left\{ \begin{array}{l} 4.47\% \text{ K}^+ \\ 0.11\% \text{ Ca}^{++} \end{array} \right\}$$

0.75 grams Sodium hexametaphosphate
30.00 grams Whip-treme 3296 (Beatrice Foods Co.)
50.00 grams Sugar
6.00 grams Sodium caseinate
0.18 grams Potassium bitartrate The dry mix was added to two cups (475 ml) of hard water (290/ppm Ca++) at 45° C. and spoon stirred until dissolved (about 2 minutes). The solution was refrigerated until set.

In this case, the system contained a total of 100 ppm K+ (77 ppm from the potassium bitartrate and 23 ppm from the carrageenan) and 300 ppm Ca++ (294 ppm from the hard water and 6 ppm from the carrageenan).

EXAMPLE 6

Non-dairy Whipped Dessert 1.87 grams Potassium sensitive (kappa) carrageenan $$\left\{ \begin{array}{l} 5.4\% \text{ K}^+ \\ 2.6\% \text{ Ca}^{++} \end{array} \right\}$$

0.56 grams Sodium hexametaphosphate
40.00 grams Whip-treme 3296—(Beatrice Foods Co.) (contains 63.5% fat)
40.00 grams Sugar
Flavor & color to suit The dry mix was added to 1 cup (235 ml) of water at 45° C. in an electric mixer bowl. Slow speed for 1 minute to disperse powder and then whipping at high speed for 5 minutes.

Product was refrigerated. It set to a spongy cheesecake-like structure with excellent mouth feel characteristics. It also had excellent freeze-thaw properties.

I claim:

1. A composition, useful for the preparation of edible carrageenan water gels having controlled melting temperatures, consisting essentially of kappa carrageenan, a non-toxic sodium salt of a sequestering agent, and non-toxic potassium in an ionizable form, said sequestering agent and said potassium being present in said composition in amounts sufficient, respectively, to sequester substantially all of the polyvalent cations present when the composition is dissolved in an aqueous medium, and to provide the sol (such aqueous medium) with a potassium ion content of from about 200 to about 800 ppm.

2. The composition of claim 1 in which the potassium is present as potassium carrageenate.

3. The composition of claim 1 in which the potassium is present as a salt of potassium soluble in an aqueous medium.

4. The composition of claim 1 in which the potassium is present as a mixture of potassium carrageenate and a salt of potassium soluble in an aqueous medium.

5. The composition of claim 1 in which the sequestering agent is a sodium salt soluble in an aqueous medium and selected from the group consisting of organic hydroxy carboxylic acids, orthophosphates, carbonates, pyrophosphates, and polyphosphates.

6. The composition of claim 1 further comprising flavoring and sweetening agents soluble in an aqueous medium.

7. The composition of claim 1 further comprising dried emulsified fats.

8. The composition of claim 1 further comprising dried non-dairy protein.

9. The method of producing an edible carrageenan water gel capable of melting within the mouth of a consumer, which comprises preparing a gellable aqueous sol by mixing in water kappa carrageenan, a non-toxic sodium salt of a sequestering agent for sequestering substantially all of the polyvalent cations present in said sol, a non-toxic ionizable potassium substance providing the aqueous sol with a potassium ion concentration of from about 200 and about 800 ppm, and allowing the sol to set.

10. The method of claim 9 wherein the gellable aqueous sol further includes dispersed emulsified fats.

11. The method of claim 10 wherein the gellable aqueous sol further includes dispersed non-dairy protein, and wherein the sol is whipped to aerate the same prior to setting.

* * * * *

UNITED STATES PATENT AND TRADEMARK OFFICE
CERTIFICATE OF CORRECTION

PATENT NO. : 4,276,320

DATED : June 30, 1981

INVENTOR(S) : Arthur L. Moirano

It is certified that error appears in the above—identified patent and that said Letters Patent is hereby corrected as shown below:

Column 5, Example 2, line 29, "4.47% $K^+$" should read -- 0.47% $K^+$ --. Column 6, Example 5, line 37, "4.47% $K^+$" should read -- 0.47% $K^+$ --.

Signed and Sealed this

Eighth Day of December 1981

[SEAL]

Attest:

GERALD J. MOSSINGHOFF

*Attesting Officer*  *Commissioner of Patents and Trademarks*